(12) United States Patent
Takahashi

(10) Patent No.: US 9,429,741 B2
(45) Date of Patent: Aug. 30, 2016

(54) ZOOM LENS AND IMAGE PROJECTION APPARATUS INCLUDING THE SAME

(71) Applicant: CANON KABUSHIKI KAISHA, Tokyo (JP)

(72) Inventor: Makoto Takahashi, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 4 days.

(21) Appl. No.: 14/462,074

(22) Filed: Aug. 18, 2014

(65) Prior Publication Data

US 2015/0055225 A1    Feb. 26, 2015

(30) Foreign Application Priority Data

Aug. 22, 2013   (JP) .................................. 2013-172022

(51) Int. Cl.
G02B 15/14      (2006.01)
G02B 9/64       (2006.01)
(Continued)

(52) U.S. Cl.
CPC ............. *G02B 15/177* (2013.01); *G02B 13/04* (2013.01); *G02B 5/005* (2013.01); *G02B 9/10* (2013.01); *G02B 9/60* (2013.01); *G02B 9/62* (2013.01); *G02B 9/64* (2013.01); *G02B 13/006* (2013.01); *G02B 13/009* (2013.01); *G02B 13/0045* (2013.01); *G02B 13/16* (2013.01); *G02B 15/14* (2013.01); *G02B 15/167* (2013.01); *G02B 15/20* (2013.01); *G02B 15/24* (2013.01);
(Continued)

(58) Field of Classification Search
CPC  G02B 15/177; G02B 13/0045; G02B 13/04; G02B 13/16; G02B 13/009; G02B 15/14; G02B 15/20; G02B 9/60; G02B 9/62; G02B 15/167; G02B 13/006; G02B 9/64; G02B 15/24; G02B 5/005; G02B 9/10; H04N 5/23296; G03B 21/142; G03B 13/32; G03B 2205/0046
USPC ....... 359/649–651, 680, 682, 683, 686, 740, 359/750–753, 761, 770, 781
See application file for complete search history.

(56) References Cited

U.S. PATENT DOCUMENTS

2007/0223103 A1   9/2007   Yamamoto
2013/0057732 A1   3/2013   Ryosuke
2014/0254027 A1*  9/2014   Amano ................ G02B 15/177
                                                  359/683

FOREIGN PATENT DOCUMENTS

CN          1480756 A       3/2004
CN         103837970 A       6/2014
(Continued)

*Primary Examiner* — Evelyn A Lester
(74) *Attorney, Agent, or Firm* — Canon U.S.A. Inc., IP Division

(57) ABSTRACT

A zoom lens includes, sequentially from an enlargement conjugate side to a reduction conjugate side: a 1st lens unit having negative refractive power not moved during zooming; plural lens units that are moved during zooming; and a final lens unit having positive refractive power that is not moved during zooming. A final moving lens unit having positive refractive power and disposed nearest to the reduction conjugate side among the plural lens units that are moved during zooming is moved toward the enlargement conjugate side during zooming from a wide angle end to a telephoto end, and the final moving lens unit includes one or more cemented lenses, and the final moving lens unit includes one or more negative lenses and one or more positive lenses. Predetermined conditional expressions are satisfied to maintain wide angle of view and high image quality along the entire zoom range.

8 Claims, 17 Drawing Sheets

(51) Int. Cl.
    *G02B 15/177*      (2006.01)
    *G02B 13/04*      (2006.01)
    *G03B 21/14*      (2006.01)
    *G02B 15/20*      (2006.01)
    *G02B 15/167*      (2006.01)
    *G03B 13/32*      (2006.01)
    *H04N 5/232*      (2006.01)
    *G02B 13/00*      (2006.01)
    *G02B 9/60*      (2006.01)
    *G02B 9/62*      (2006.01)
    *G02B 15/24*      (2006.01)
    *G02B 13/16*      (2006.01)
    *G02B 9/10*      (2006.01)
    *G02B 5/00*      (2006.01)

(52) U.S. Cl.
    CPC ............ *G03B 13/32* (2013.01); *G03B 21/142* (2013.01); *G03B 2205/0046* (2013.01); *H04N 5/23296* (2013.01)

(56) References Cited

FOREIGN PATENT DOCUMENTS

| | | |
|---|---|---|
| JP | 2003-15038 A | 1/2003 |
| JP | 2007-256424 A | 10/2007 |

* cited by examiner

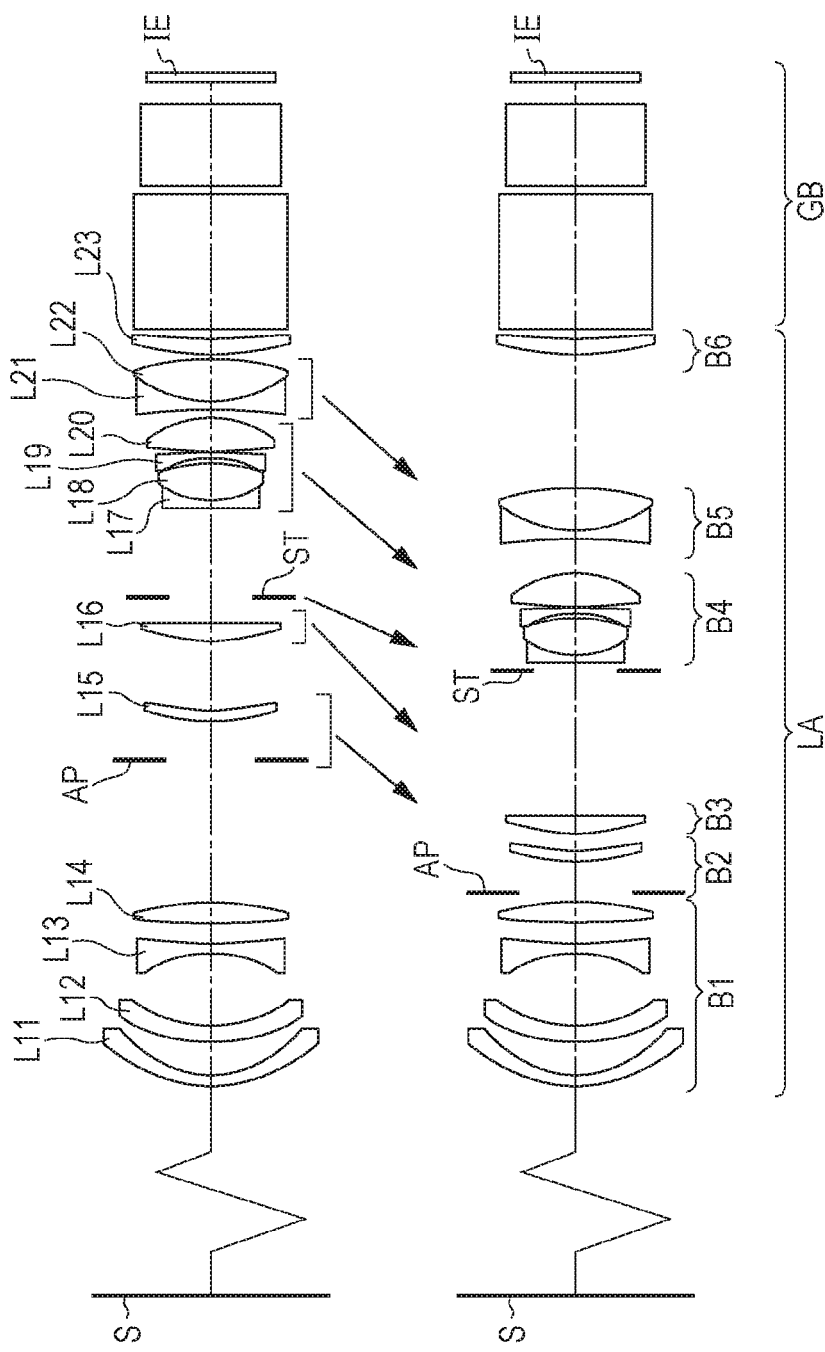

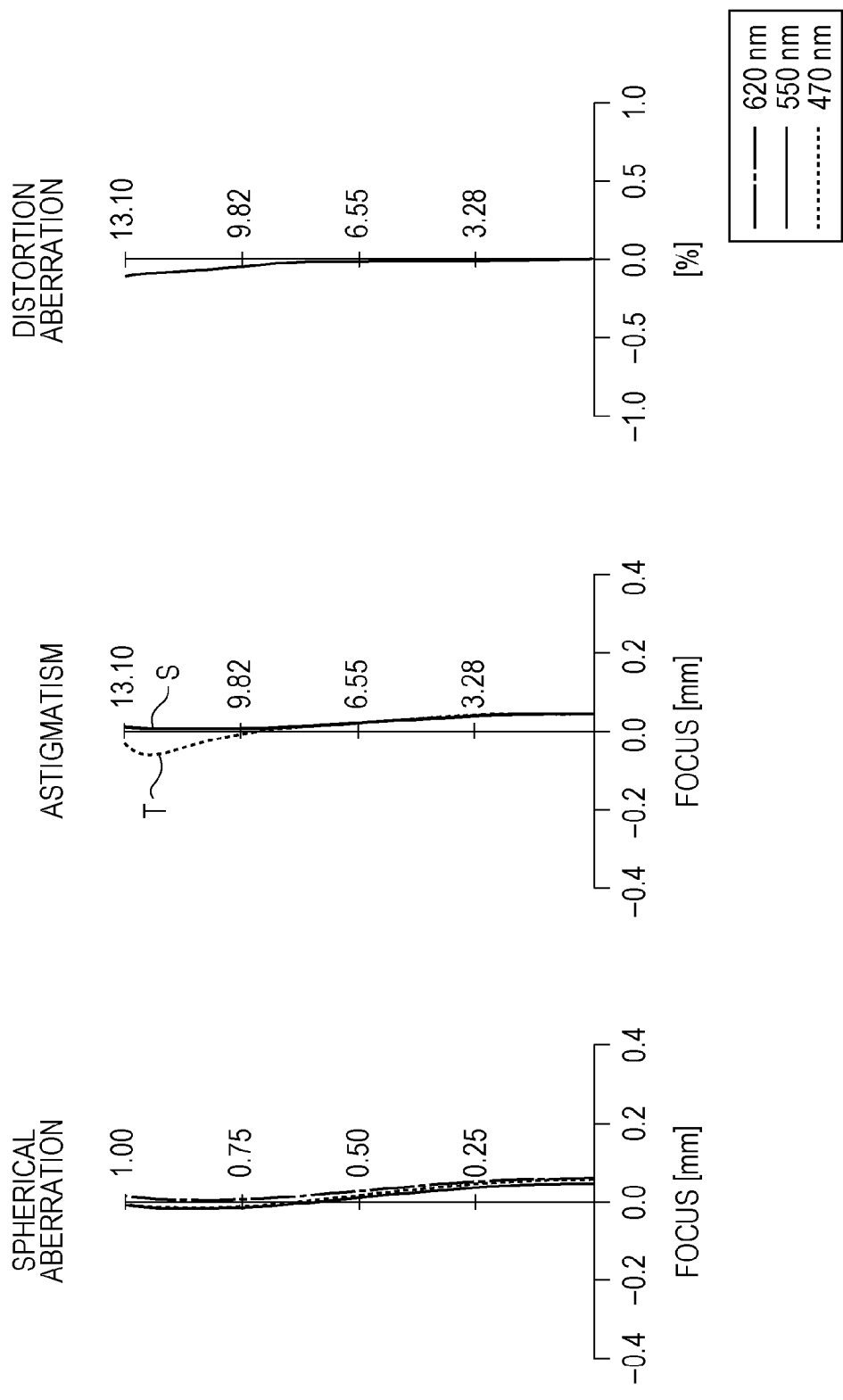

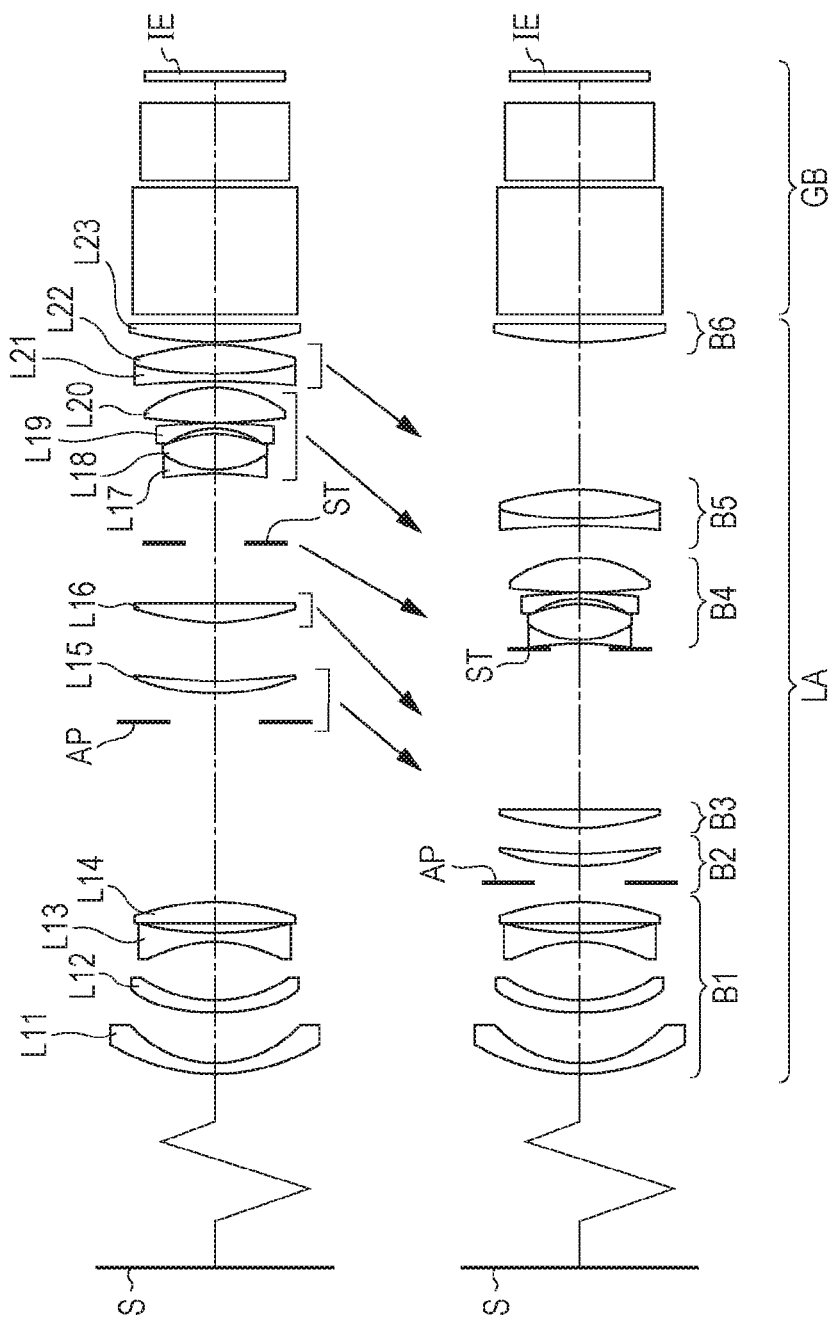

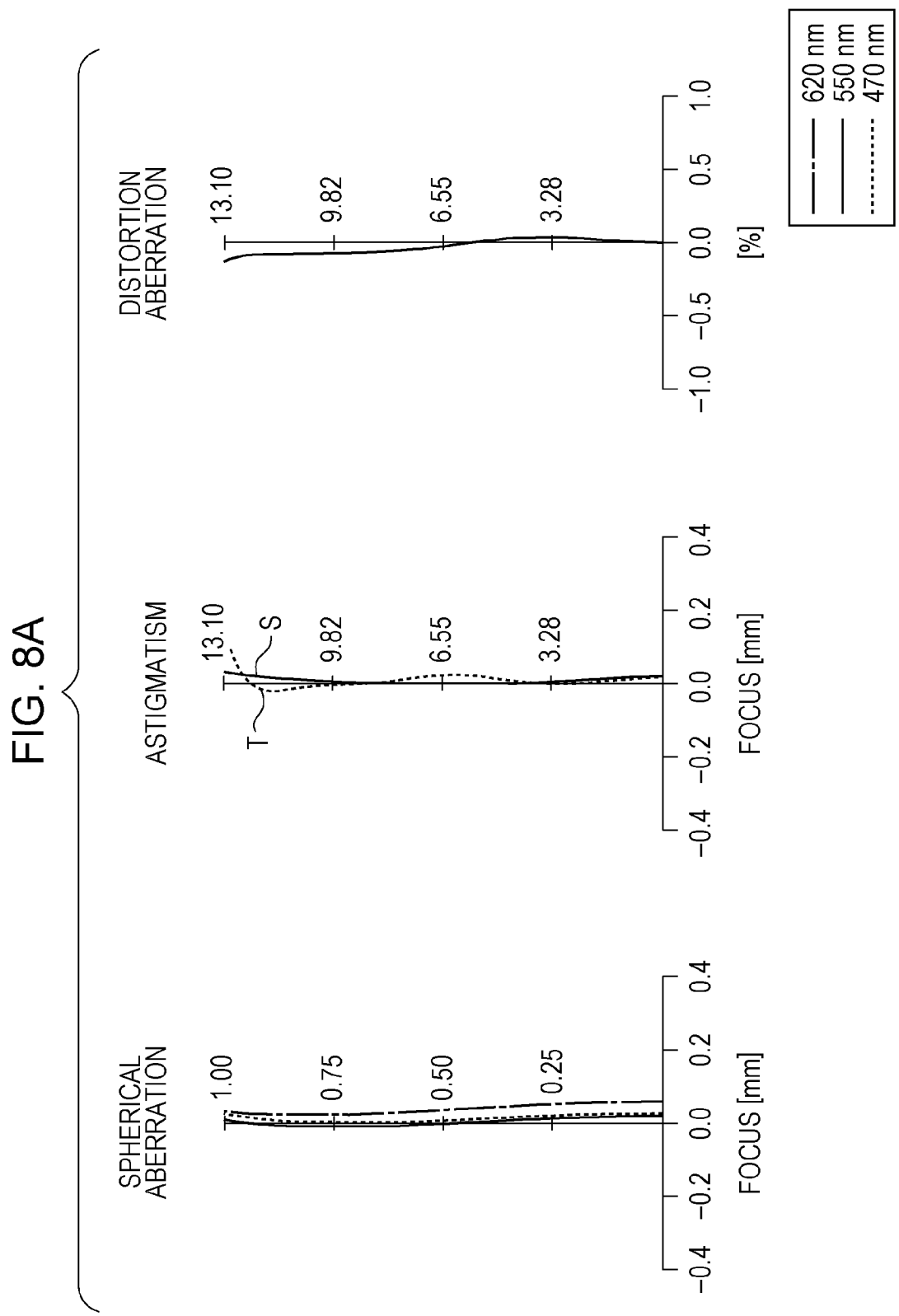

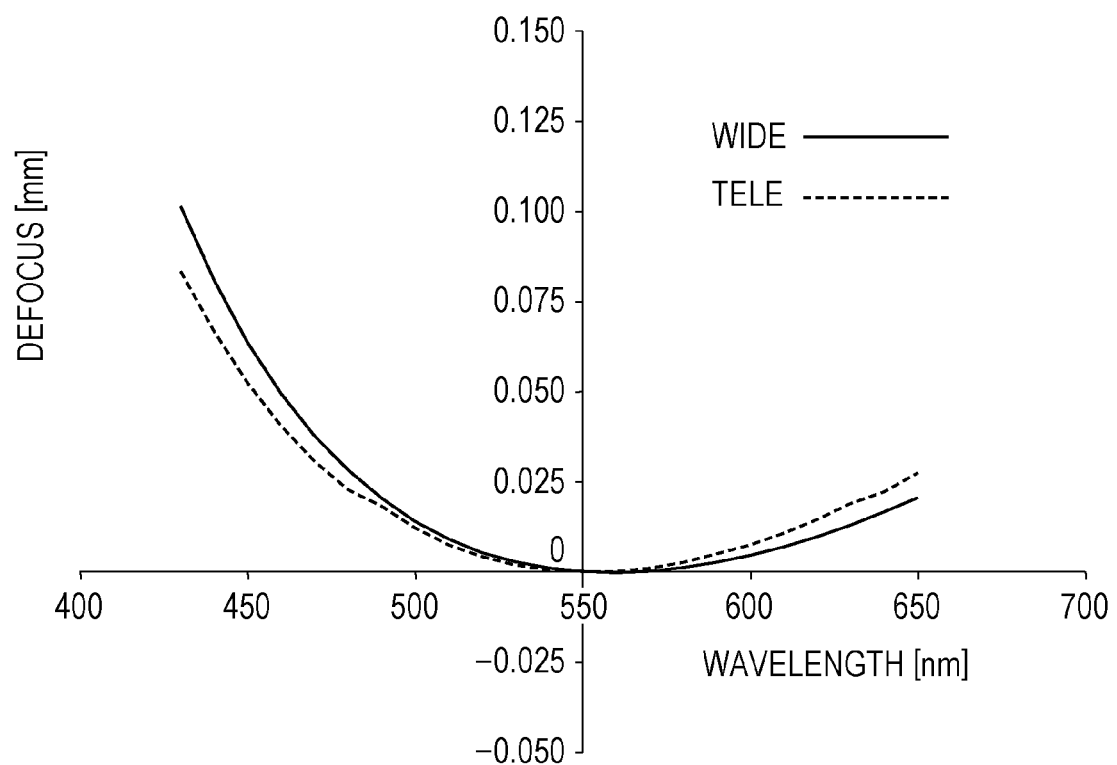

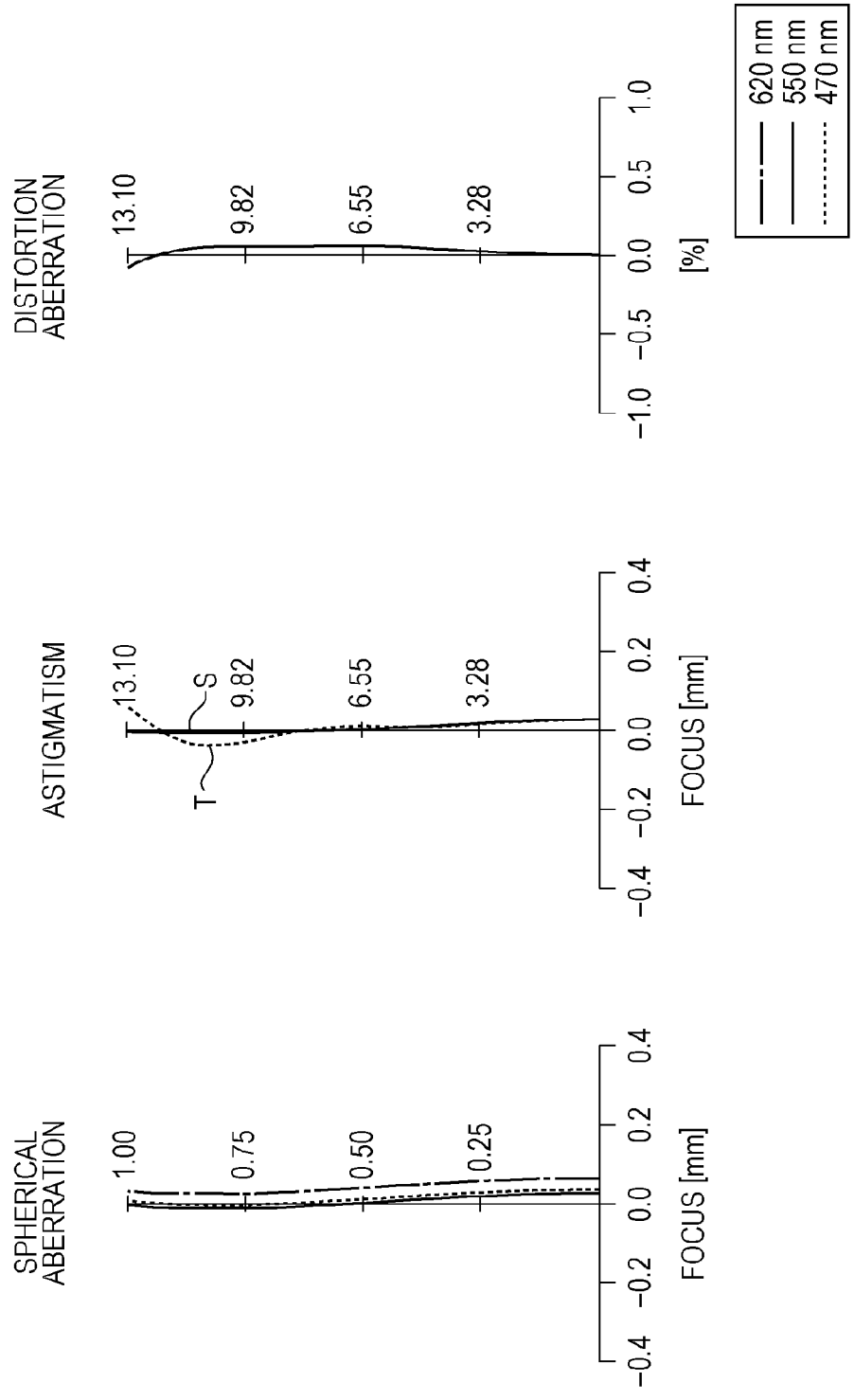

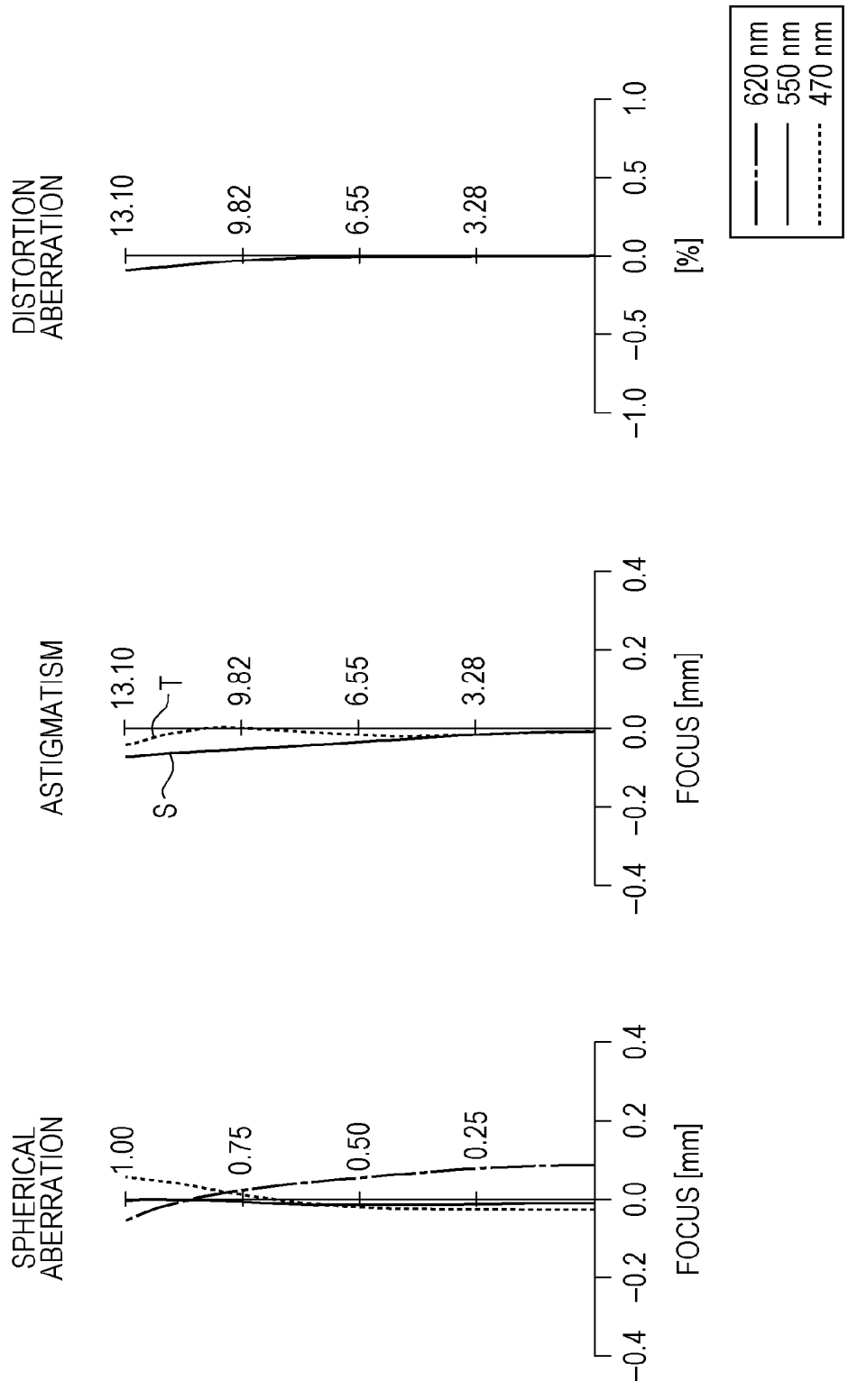

ZOOM LENS AND IMAGE PROJECTION APPARATUS INCLUDING THE SAME

BACKGROUND OF THE INVENTION

1. Field of the Invention

The present invention relates to a zoom lens suitable as, for example, a projector lens used for an image projection apparatus (i.e., a projector) that enlarges and projects an image on a screen.

2. Description of the Related Art

Various image projection apparatuses (i.e., projectors) that use image display elements, such as liquid crystal, enlarge and project an image in accordance with the image display elements on a screen surface through a projection optical system have been proposed. As a projection optical system used for a projector, a zoom lens capable of projecting at various projection magnifications and projecting at a wide view angle on a large screen from a short distance is demanded. Further, a zoom lens having a long back focus is demanded so that a color separation optical system, a color synthesis optical system and the like may be disposed between a projection optical system and image display elements.

As a zoom lens for a projector that is capable of projecting at a wide view angle and having a long back focus, a retro focus type zoom lens has been proposed (U.S. Patent No. 2007/0223103 A1 and Japanese Patent Application Laid-Open No. 2003-15038). U.S. Patent No. 2007/0223103 A1 discloses a zoom lens that is capable of projecting at a wide view angle and is constituted by 1st to 6th lens units having negative, positive, positive, positive, negative and positive refractive power sequentially from an enlargement conjugate side to a reduction conjugate side. During zooming, the 1st and the 6th lens units are not moved and the 2nd to the 5th lens units are moved.

Japanese Patent Application Laid-Open No. 2003-15038 discloses a zoom lens that is capable of projecting at a wide view angle and is constituted by 1st to 6th lens units having negative, positive, positive, negative, positive and positive refractive power sequentially from an enlargement conjugate side to a reduction conjugate side. During zooming, the 1st, the 4th and the 6th lens units are not moved and the 2nd, the 3rd and the 5th lens units are moved.

SUMMARY OF THE INVENTION

A zoom lens of the present invention includes, sequentially from an enlargement conjugate side to a reduction conjugate side:
a 1st lens unit having negative refractive power that is not moved during zooming;
plural lens units that are moved during zooming; and a final lens unit having positive refractive power that is not moved during zooming,
wherein
a final moving lens unit disposed nearest to the reduction conjugate side among the plural lens units that are moved during zooming is moved toward the enlargement conjugate side during zooming from a wide angle end to a telephoto end with the positive refractive power, and the final moving lens unit includes one or more cemented lenses, and the final moving lens unit includes one or more negative lenses and one or more positive lenses; and
the following conditions are satisfied:

$$5.00 < f/fw$$

$$|nn-np| < 0.080$$

$$0.0 < vn-vp$$

where
f is a focal length of the final moving lens unit;
fw is a focal length of the zoom lens at a wide angle end;
nn and vn are an average refractive index and an average Abbe number of a material of one negative lens that is included in the final moving lens unit; and
np and vp are an average refractive index and an average Abbe number of a material of one positive lens that is included in the final moving lens unit.

Further features of the present invention will become apparent from the following description of exemplary embodiments with reference to the attached drawings.

BRIEF DESCRIPTION OF THE DRAWINGS

FIGS. 1A and 1B are cross-sectional views of a zoom lens at a wide angle end and at a telephoto end, respectively, according to Example 1.

FIGS. 4A and 4B are aberration diagrams at a projection distance of 2100 mm at the wide angle end and at the telephoto end of Example 1.

FIGS. 5A and 5B are cross-sectional views of a zoom lens at a wide angle end and at a telephoto end, respectively, according to Example 2.

FIGS. 8A and 8B are aberration diagrams at a projection distance of 2100 mm at the wide angle end and at the telephoto end of Example 2.

FIG. 11 is an on-axis chromatic aberration diagram at the wide angle end and at the telephoto end of Example 3.

FIGS. 12A and 12B are aberration diagrams at a projection distance of 2100 mm at the wide angle end and at the telephoto end of Example 3.

DESCRIPTION OF THE EMBODIMENTS

Figure 2A:
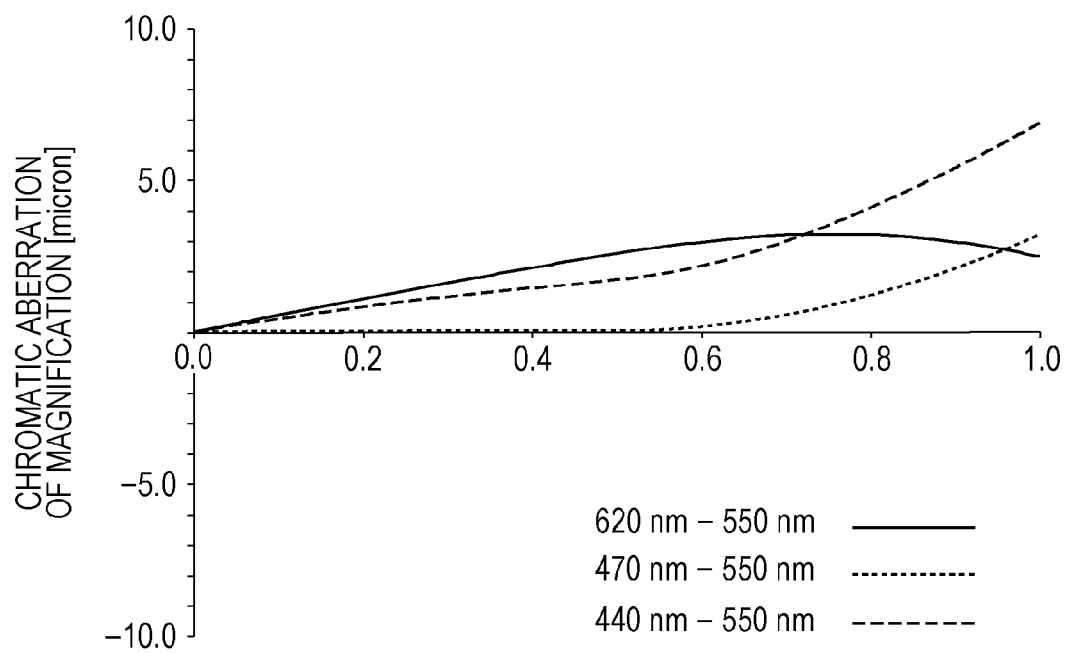
FIGS. 2A and 2B are diagrams of chromatic aberration of magnification at the wide angle end and at the telephoto end of Example 1.

It is highly desirable that a zoom lens used for a projector projects at a wide view angle and with high quality image. In order to provide a high quality image, it is important that various aberrations, especially chromatic aberration, are appropriately corrected. In order to project at a wide view angle and to project an image of low chromatic aberration and high quality, it is important to properly determine a zoom type of the zoom lens and a lens configuration of each lens unit, e.g., a lens configuration of each lens unit that is moved during zooming.

In accordance with the various embodiments of the present invention a zoom lens capable of projecting at a wide view angle with a small fluctuation in chromatic aberration during zooming and capable of providing desirable optical performance in an entire zooming range is disclosed.

Hereinafter, embodiments of the present invention will be described with reference to each example of the zoom lens illustrated in the drawings. A zoom lens of the present invention includes, sequentially from an enlargement conjugate side to a reduction conjugate side, a 1st lens unit having negative refractive power that is not moved during zooming, plural lens units that are moved during zooming, and a final lens unit having positive refractive power that is not moved during zooming. The final moving lens unit disposed nearest to the reduction conjugate side among the plural lens units that are moved during zooming is moved toward the enlargement conjugate side during zooming from the wide angle end to the telephoto end with the positive refractive power.

Figure 2B:
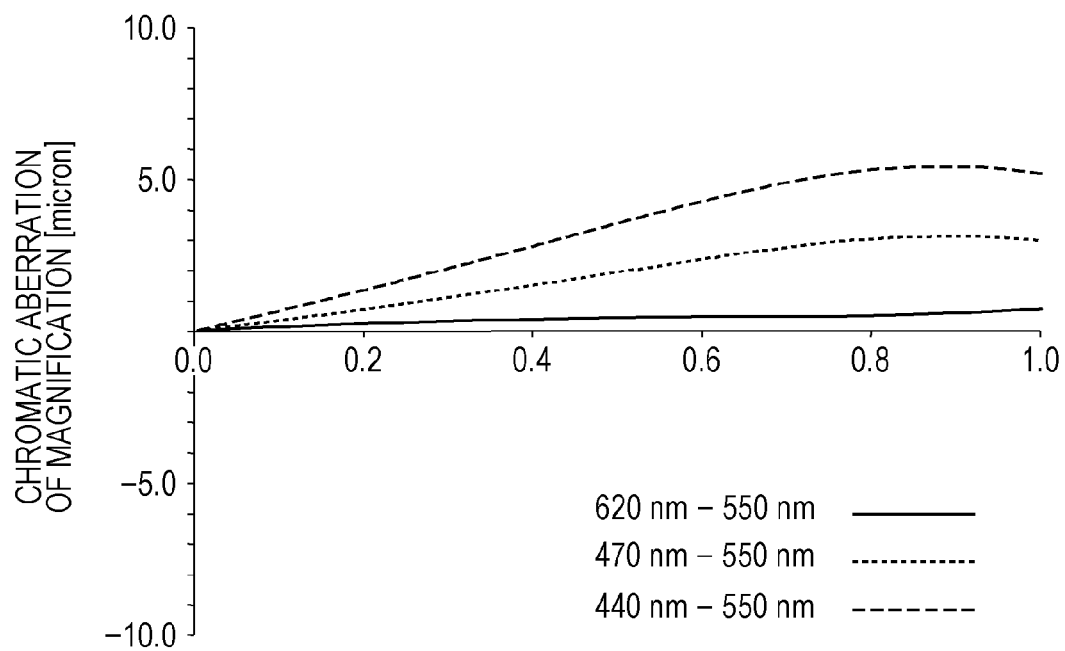
Figure 3:
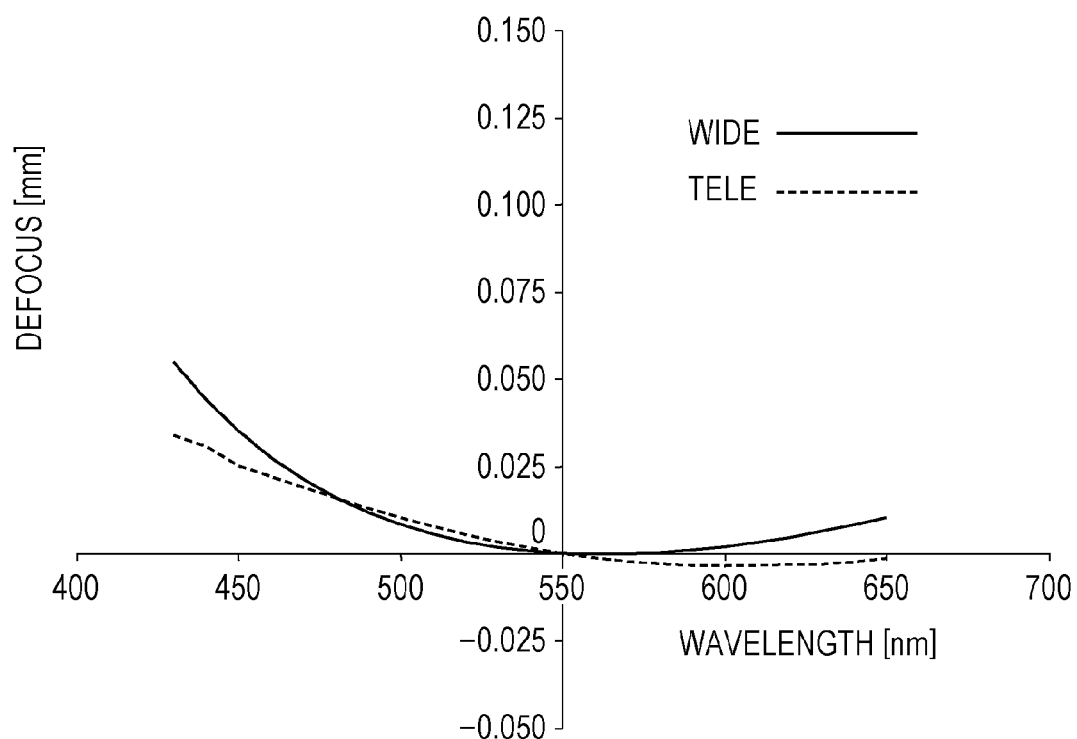
FIG. 3 is an on-axis chromatic aberration diagram at the wide angle end and at the telephoto end of Example 1.
Figure 4B:
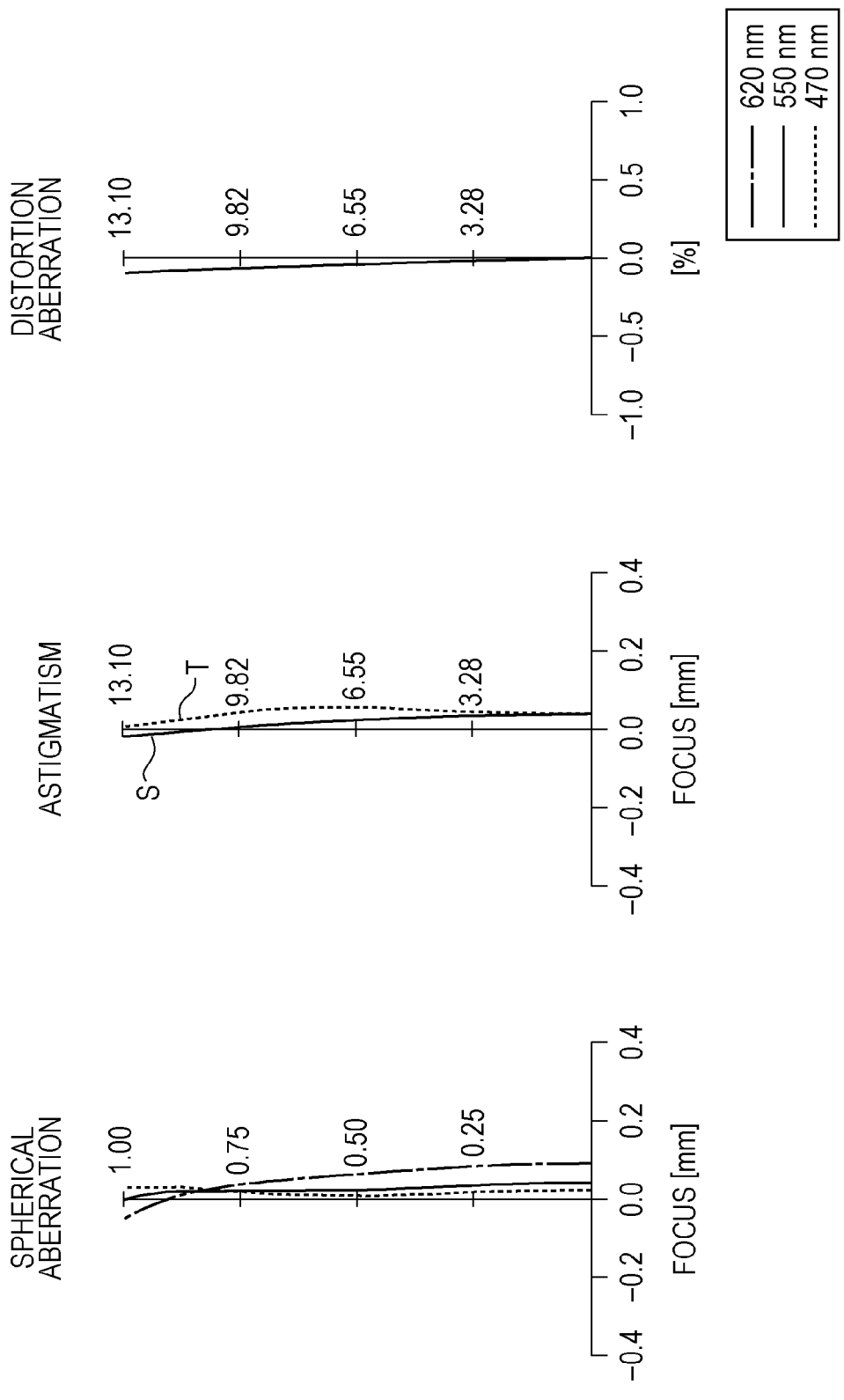

FIGS. 1A and 1B are cross-sectional views of lenses at a wide angle end (i.e., a short focal length end) and at a telephoto end (i.e., a long focal length end) of the zoom lens of Example 1 of the present invention. FIGS. 2A and 2B are diagrams of chromatic aberration of magnification at the wide angle end and at the telephoto end of the zoom lens of Example 1 of the present invention. FIG. 3 is an on-axis chromatic aberration diagram at the wide angle end and at the telephoto end of the zoom lens of Example 1 of the present invention. FIGS. 4A and 4B are longitudinal aberration diagrams at the wide angle end and at the telephoto end at a projection distance of 2100 mm of the zoom lens of Example 1 of the present invention.

Figure 6A:
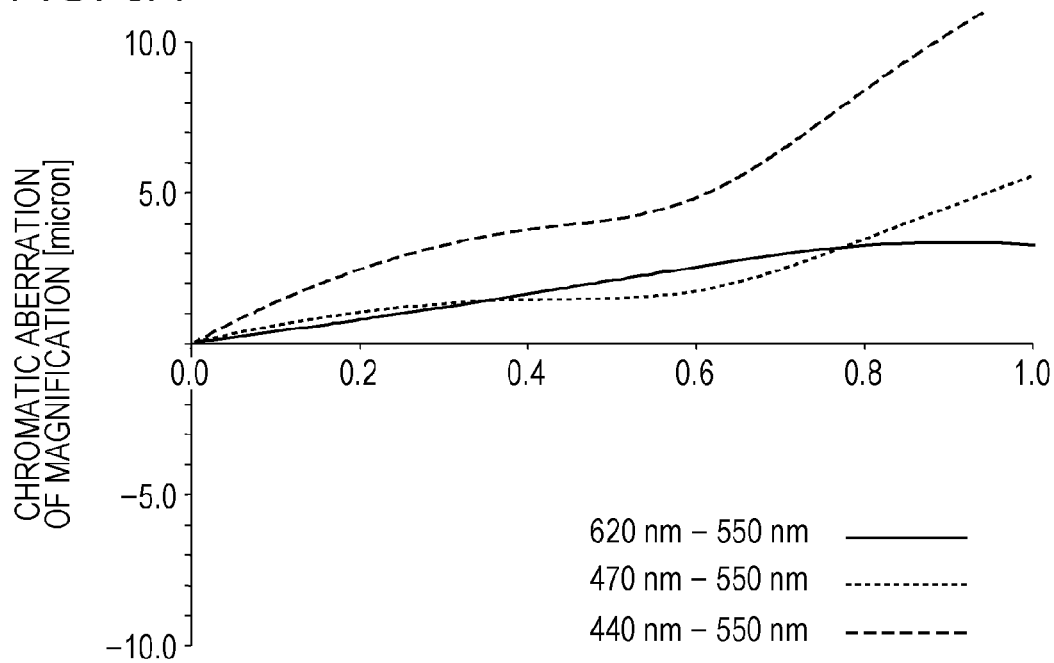
FIGS. 6A and 6B are diagrams of chromatic aberration of magnification at the wide angle end and at the telephoto end of Example 2.
Figure 6B:
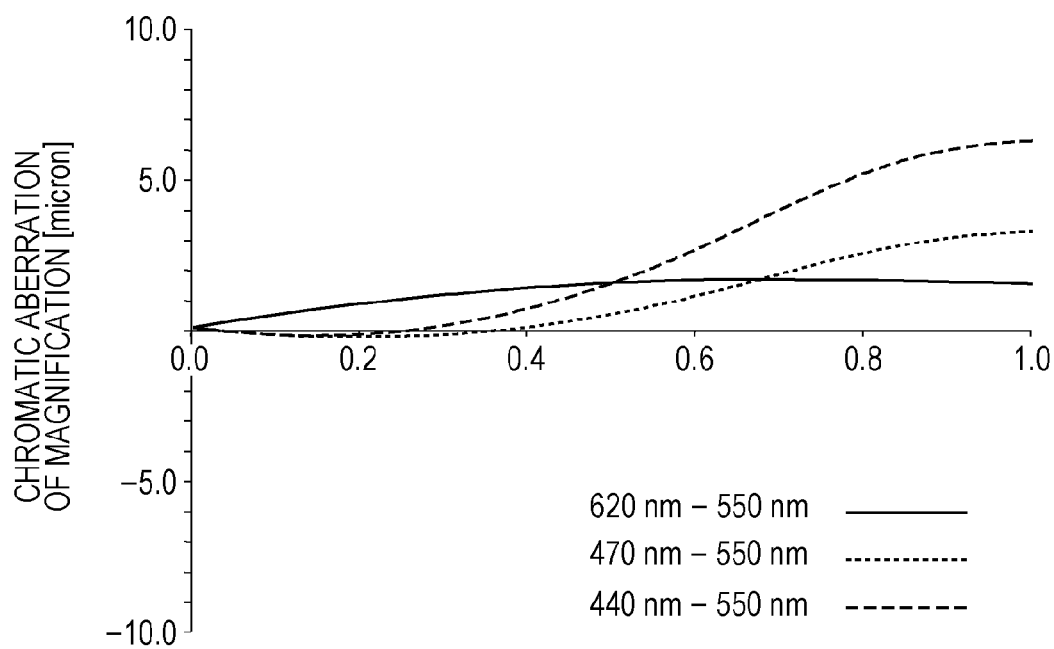
Figure 7:
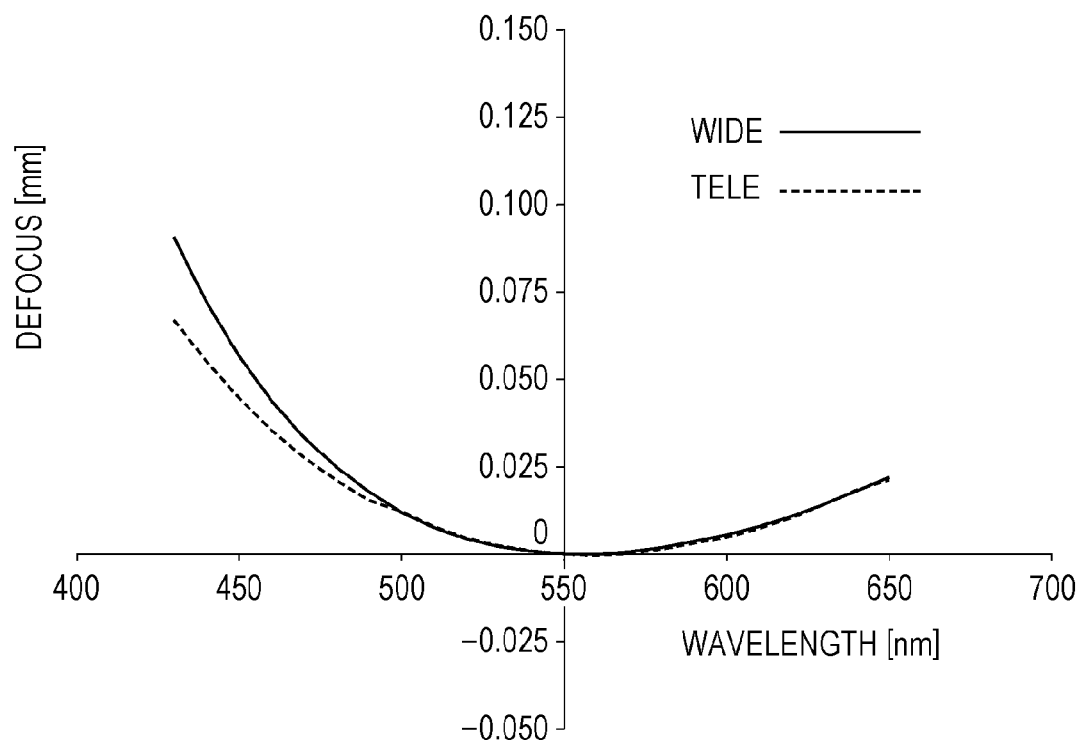
FIG. 7 is an on-axis chromatic aberration diagram at the wide angle end and at the telephoto end of Example 2.
Figure 8B:
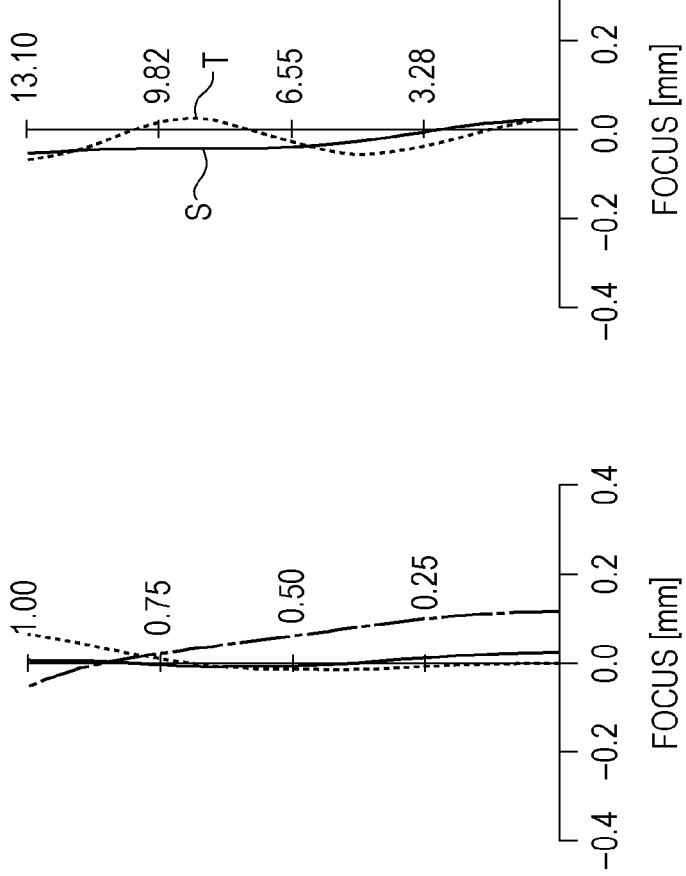

FIGS. 5A and 5B are cross-sectional views of lenses at a wide angle end and at a telephoto end of a zoom lens of Example 2 of the present invention. FIGS. 6A and 6B are diagrams of chromatic aberration of magnification at the wide angle end and at the telephoto end of the zoom lens of Example 2 of the present invention. FIG. 7 is an on-axis chromatic aberration diagram at the wide angle end and at the telephoto end of the zoom lens of Example 2 of the present invention. FIGS. 8A and 8B are longitudinal aberration diagrams at the wide angle end and at the telephoto end at a projection distance of 2100 mm of the zoom lens of Example 2 of the present invention.

Figures 9A, 9B:
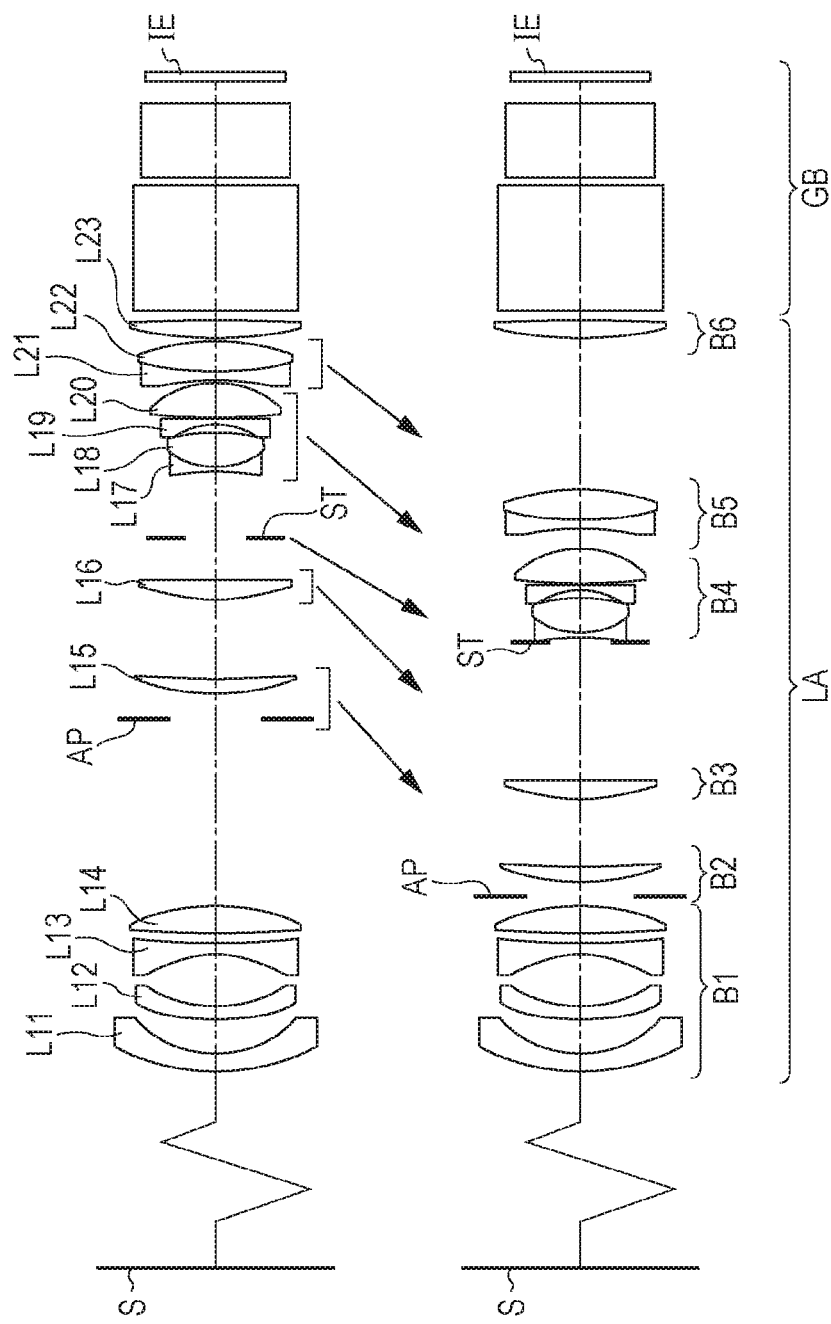
FIGS. 9A and 9B are cross-sectional views of a zoom lens at a wide angle end and at a telephoto end, respectively, according to Example 3.
Figure 10A:
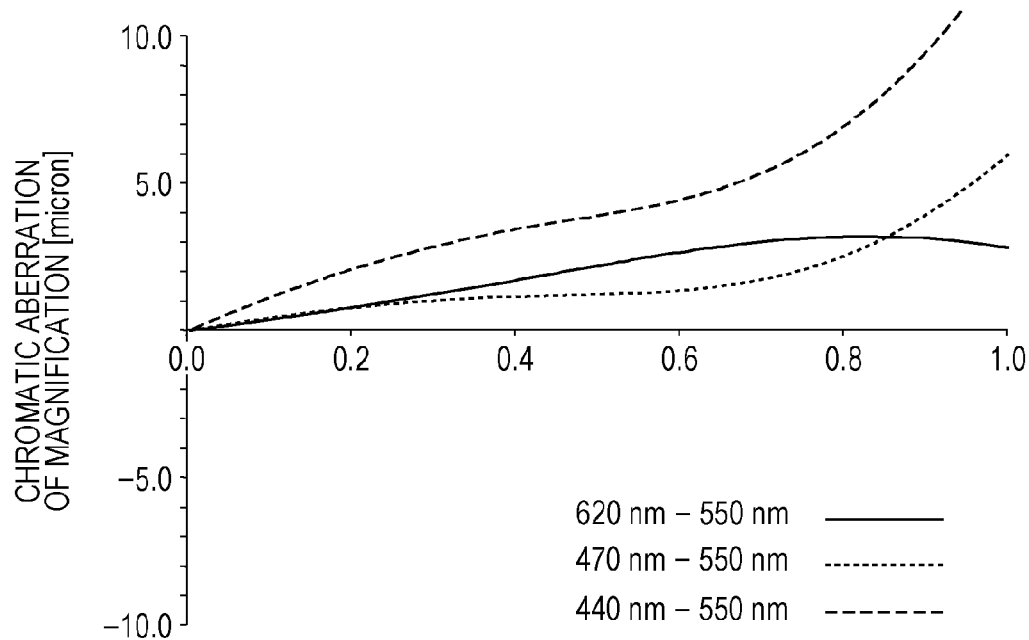
FIGS. 10A and 10B are aberration diagrams of chromatic aberration of magnification at the wide angle end and at the telephoto end of Example 3.
Figure 10B:
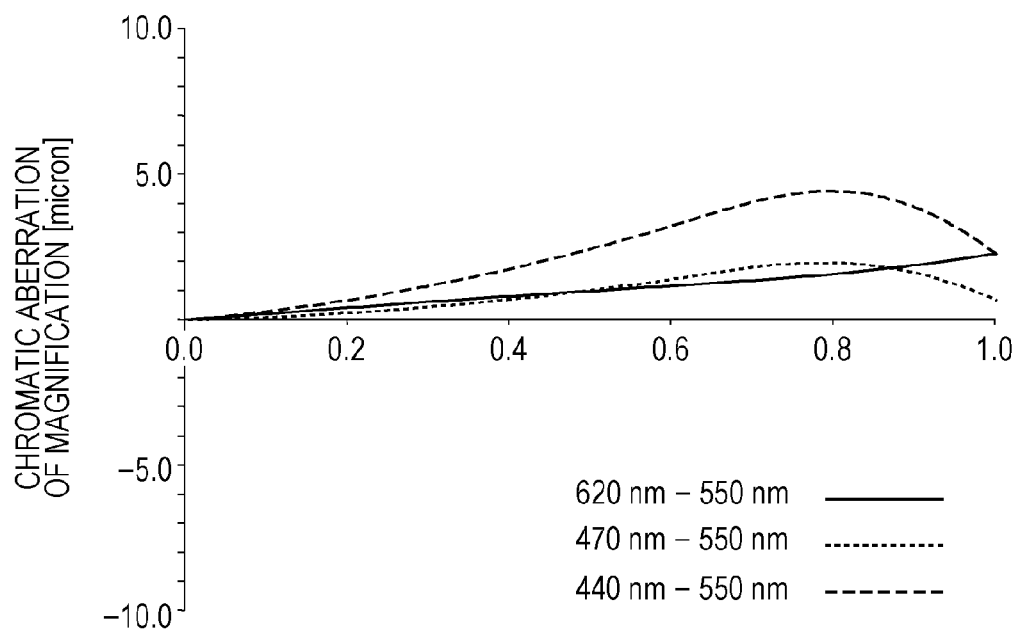
Figure 13:
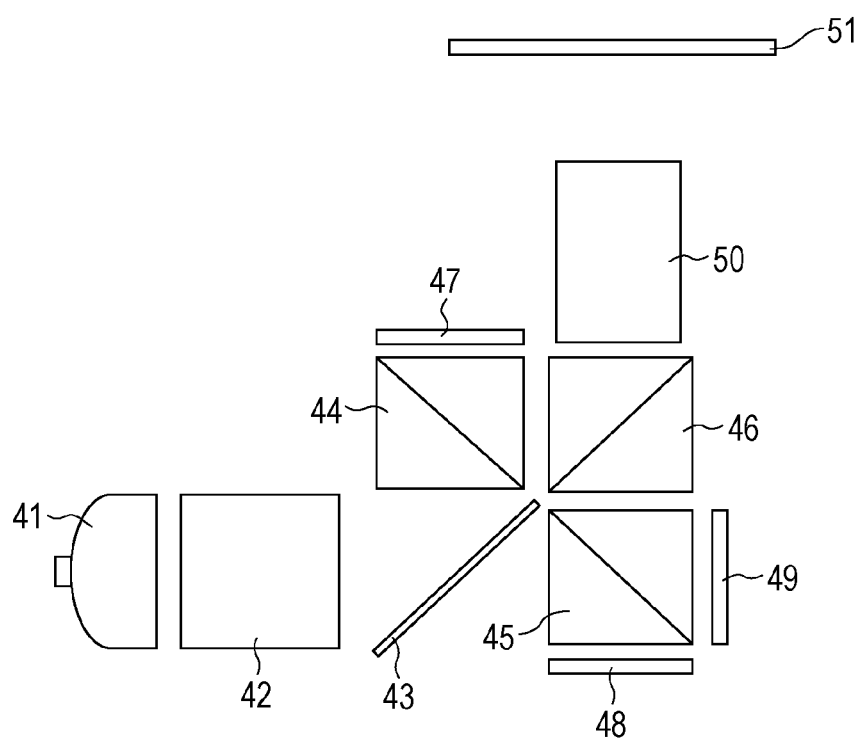
FIG. 13 is a schematic diagram of an image projection apparatus including a zoom lens according to any one example of the present invention.
Figure 14A:
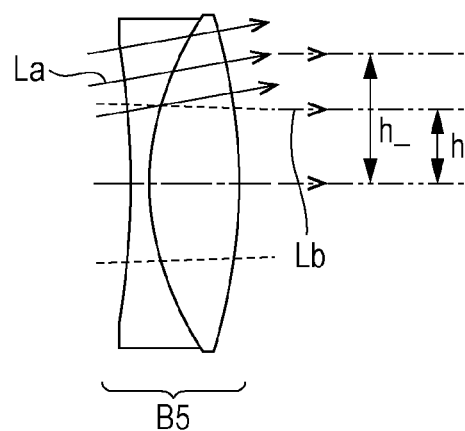
FIGS. 14A and 14B are optical explanatory views of chromatic aberration.
Figure 14B:
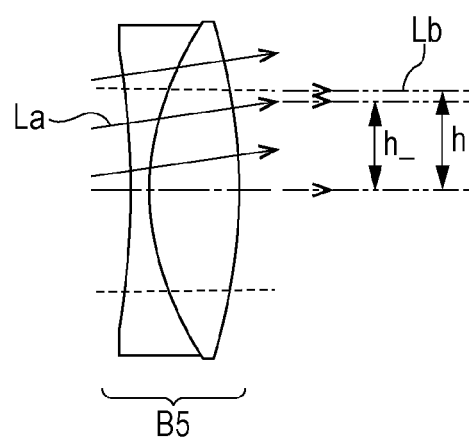

FIGS. 9A and 9B are cross-sectional views of lenses at a wide angle end and at a telephoto end of a zoom lens of Example 3 of the present invention. FIGS. 10A and 10B are diagrams of chromatic aberration of magnification at the wide angle end and at the telephoto end of the zoom lens of Example 3 of the present invention. FIG. 11 is an on-axis chromatic aberration diagram at the wide angle end and at the telephoto end of the zoom lens of Example 3 of the present invention. FIGS. 12A and 12B are longitudinal aberration diagrams at the wide angle end and at the telephoto end at a projection distance of 2100 mm of the zoom lens of Example 3 of the present invention. FIG. 13 is a schematic diagram of a main part of an image projection apparatus which includes the zoom lens of the present invention. FIGS. 14A and 14B are explanatory views of correction of chromatic aberration at the wide angle end and at the telephoto end.

The zoom lens of each example is a projector lens (i.e., a projection optical system) used for an image projection apparatus (i.e., a projector). In the cross-sectional views of the lenses, the left side corresponds to the enlargement conjugate side (i.e., on the screen side: front) and the right side corresponds to the reduction conjugate side (i.e., image display elements side: back). LA denotes a zoom lens. Bi denotes the i-th lens unit when i is the number of order of the lens unit counted from the enlargement conjugate side. ST denotes an aperture diaphragm. AP denotes an auxiliary diaphragm. IE corresponds to an original image (i.e., a projected image) on, for example, a liquid crystal panel (i.e., image display elements).

S denotes a screen surface. GB denotes an optical block corresponding to prism for color separation and color synthesis, an optical filter, a face plate (i.e., a parallel plate glass), a crystal low-pass filter, an infrared cut filter and the like. Arrows represent directions in which the lens units are moved during zooming (i.e., movement loci) from the wide angle end to the telephoto end. The wide angle end and the telephoto end refer to zooming positions when the lens units for zooming are mechanically located at both ends of the movable range on an optical axis.

In the aberration diagram, Fno denotes an F-number and ω denotes a half field angle (degrees). In the spherical aberration diagram, spherical aberrations regarding wavelengths of 470 nm, 550 nm and 620 nm are illustrated. In the astigmatism diagram, a dotted line represents a meridional image surface and a solid line represents a sagittal image surface. In the distortion aberration diagram, distortion aberration regarding a wavelength of 550 nm is illustrated.

The zoom lens of each example includes, sequentially from the enlargement conjugate side to the reduction conjugate side, a 1st lens unit B1 having negative refractive power, the auxiliary diaphragm AP, a 2nd lens unit B2 having positive refractive power and a 3rd lens unit B3 having positive refractive power which are moved during focusing (i.e., which have a focusing function).

The zoom lens further includes a 4th lens unit B4 having negative refractive power, a 5th lens unit B5 having positive refractive power and a 6th lens unit B6 having positive refractive power. During zooming, the 1st lens unit B1 and the 6th lens unit B6 are not moved. During zooming from the wide angle end to the telephoto end, all of the 2nd lens unit B2 to the 5th lens unit B5 are moved toward the enlargement conjugate side. The 1st lens unit B1 and the 6th lens unit B6 do not contribute to zooming and the 2nd lens unit B2 to the 5th lens unit B5 are zoom lens units.

The auxiliary diaphragm AP is moved integrally with (i.e., on the same track of) the 2nd lens unit B2 during zooming. The aperture diaphragm ST is moved independently from (i.e., on a track different from those of) other lens units during zooming.

Each example is a zoom lens used for an image projection apparatus provided with image display elements (i.e., especially a 3-chip projector provided with a liquid crystal display element). The zoom lens of each example may be used as an imaging optical system for an image pick-up apparatus in which an image pickup element is used instead of image display elements.

The zoom lens of each example is constituted by, sequentially from the enlargement conjugate side to the reduction conjugate side, six lens units of the 1st lens unit B1 to the 6th lens unit B6 having negative, positive, positive, negative, positive and positive refractive power. During zooming, the 2nd lens unit B2 to the 5th lens unit B5 are moved. The 5th lens unit B5 is formed by a cemented lens and is the final lens unit that is moved from the reduction conjugate side to the enlargement conjugate side during zooming from the wide angle side to the telephoto side.

FIGS. 14A and 14B are explanatory views at the wide angle end and at the telephoto end of a light flux that passes the 5th lens unit B5 during zooming. In FIGS. 14A and 14B, La denotes a principal ray of an off-axis ray. Lb denotes marginal light of an on-axis ray. h_ denotes a height of the principal ray La from an optical axis immediately after the emission from the 5th lens unit B5. h denotes a height of the marginal light Lb from the optical axis immediately after the emission from the 5th lens unit B5. At the wide angle end, by moving the 5th lens unit B5 during zooming, as illustrated in FIG. 14A, the incident height h_ of the principal ray La of the off-axis ray passes a position separated from the optical axis.

At the telephoto end, as illustrated in FIG. 14B, the marginal light Lb of the on-axis ray passes a position separated from the optical axis. In this manner, chromatic aberration of magnification is effectively corrected at the wide angle side and on-axis chromatic aberration is effectively corrected at the telephoto side. In each example, as described above, since the cemented lens of small refractive power (i.e., power) is disposed in the final moving lens unit and is moved from the reduction conjugate side to the enlargement conjugate side during zooming from the wide angle side to the telephoto side, chromatic aberration of magnification and on-axis chromatic aberration are controlled to be small.

In each example, the final moving lens unit which is the 5th lens unit B5 has one or more cemented lenses. One or more negative lenses and one or more positive lenses are included in the final moving lens unit as a whole including the cemented lenses. An average refractive index and an average Abbe number of a material of one negative lens included in the final moving lens unit are respectively set to nn and vn. An average refractive index and an average Abbe number of a material of one positive lens included in the final moving lens unit are respectively set to np and vp. A focal length of the final moving lens unit is set to f, and a focal length of the entire system at the wide angle end is set to fw. Then, the following conditional expressions are satisfied:

$$5.00 < f/fw \quad (1)$$

$$|nn-np| < 0.080 \quad (2)$$

$$0.0 < vn-vp \quad (3)$$

provided that the Abbe number is defined as $v=(Nd-1)/(NF-NC)$, where a refractive index for C-line is denoted by NC, a refractive index for d-line is denoted by Nd, and a refractive index for F-line is denoted by NF.

Next, technical meaning of the above-described conditional expressions (1) to (3) will be described. The conditional expression (1) is provided to properly set the power of the cemented lenses which constitute the 5th lens unit B5, desirably correct chromatic aberration of magnification and on-axis chromatic aberration in the total zooming area, and reduce an aberration fluctuation during zooming.

If the lower limit of the conditional expression (1) is exceeded, the power of the cemented lenses becomes excessively large and fluctuations in various aberrations other than the chromatic aberration during zooming become larger. By satisfying the conditional expression (1), the fluctuation in chromatic aberration during zooming may be reduced in the total zooming area. In a case in which the cemented lenses are formed by a combination of two general glass materials having different refractive indices, since various aberrations other than chromatic aberration is fluctuated on a cemented lens surface (i.e., a degree of freedom decreases), there is a possibility that correction of the various aberrations other than chromatic aberration is insufficient.

Generally, the fluctuations in the various aberrations may be reduced by further increasing the number of lens units that are moved during zooming. In that case, however, the size of the lens system is increased.

The conditional expression (2) is provided to effectively perform chromatic aberration on the cemented lens by constituting at least one cemented lens by two glass materials having similar refractive indices. If the conditional expression (2) is not satisfied, it becomes difficult to effectively correct chromatic aberration. Note that there are two or more cemented lenses that satisfy the conditional expression (2).

The conditional expression (3) is provided to effectively perform chromatic aberration with the cemented lenses which constitute the 5th lens unit B5. Generally, in a retro focus type optical system, chromatic aberration of magnification and on-axis chromatic aberration in the blue light of short wavelength tend to occur more over than that in the green light. Then, it means what the blue light of short wavelength condenses at higher position than the green light that the chromatic aberration of magnification occurs on over direction. And, it means what the blue light of short wavelength condenses at deeper position in the direction of travel of the light than the green light that on-axis chromatic aberration occurs on over direction. For this reason, by satisfying the conditional expression (3) in each example, to offset chromatic aberration of magnification and on-axis chromatic aberration in the blue light of short wavelength on over direction, chromatic aberration on under direction is created. By this method, chromatic aberration of the entire lens system (entire zoom lens) is reduced. If the conditional expression (3) is not satisfied, correction of chromatic aberration becomes difficult. Note that there may be two or more cemented lenses that satisfy the conditional expression (3). Desirably, the numerical value ranges of the conditional expressions (1) to (3) are set to the following ranges.

$$5.00 < f/fw < 20.0 \quad (1a)$$

$$0.001 < |nn-np| < 0.080 \quad (2a)$$

$$0.0 < vn-vp < 40.0 \quad (3a)$$

More desirably, the numerical value ranges of the conditional expressions (1) to (3) are set to the following ranges.

$$5.10 < f/fw < 10.50 \quad (1b)$$

$$0.001 < |nn-np| < 0.070 \quad (2b)$$

$$3.5 < vn-vp < 5.0 \quad (3b)$$

If the upper limit value of the conditional expression (1b) is exceeded, performance change during zooming becomes excessively large, which is not desirable.

If the lower limit value of the conditional expression (2b) is exceeded, the effect of correction of various aberrations on the cemented surface becomes excessively small, which is not desirable. If the upper limit value of the conditional expression (3b) is exceeded, the chromatic aberration correction amount on the cemented surface becomes excessively large, which is not desirable.

In each example, the obtained zoom lens has the following characteristics: even if the lens configuration is a retro focus type configuration, chromatic aberration of magnification and on-axis chromatic aberration are controlled to be small in the total zooming area and optical performance is desirable. In each example, it is further desirable that the average Abbe number of the material of the lens included in the final moving lens unit is set to vav. Here, it is desirable that the following conditional expression is satisfied:

$$vav<40.0 \quad (4).$$

The conditional expression (4) is provided to improve the correction effect of chromatic aberration by means of refracting more blue light on the short wavelength side by decreasing the average Abbe number of the material of the cemented lens and using a material having high anomalous dispersion. If the upper limit value of the conditional expression (4) is exceeded, it becomes difficult to effectively correct chromatic aberration of magnification and on-axis chromatic aberration. By satisfying the conditional expression (4), it is easy to desirably correct chromatic aberration of magnification and on-axis chromatic aberration in the total zooming area even if the lens configuration is a retro focus type configuration. Desirably, the upper limit value of the conditional expression (4) is set to the following range.

$$15.0<vav<40.0 \quad (4a)$$

More desirably, the upper limit value of the conditional expression (4) is set to the following range.

$$15.0<vav<35.0 \quad (4b)$$

When the final lens unit is constituted by a cemented lens in which a negative lens and a positive lens are cemented together and the refractive power of the cemented lens surface of the cemented lens is set to φa, it is desirable that the following conditional expression is satisfied:

$$0.000<\phi a/fw<0.001 \quad (5)$$

If the upper limit value of the conditional expression (5) is exceeded, chromatic aberration of magnification is overcorrected. If the lower limit value of the conditional expression (5) is exceeded, chromatic aberration is undercorrected. More desirably, the numerical value range of the conditional expression (5) is set to the following range.

$$0.000001<\phi a/fw<0.000050 \quad (5a)$$

Next, a desirable configuration in each example will be described. It is desirable from the viewpoint of aberration correction that the cemented lens which constitutes the 5th lens unit B5 has a surface nearest to the enlargement conjugate side that is concave shaped, a surface on which lenses are cemented that is convex shaped toward the enlargement conjugate side, and a surface nearest to the reduction conjugate side that is convex shaped toward the reduction conjugate side.

The surface nearest to the enlargement conjugate side is concave shaped so that a ray is refracted to a direction to separate from the optical axis. Thus, a distance of the ray incident on surfaces after the cemented lens from the optical axis is increased and an incidence angle (i.e., angle of refraction) to the cemented lens surface is also increased. The surface on which the lenses are cemented is convex shaped toward the enlargement conjugate side, and the surface nearest to the reduction conjugate side is convex shaped toward the reduction conjugate side. With this configuration, the rays are refracted toward the optical axis direction so that chromatic aberration of magnification and on-axis chromatic aberration are undercorrected. With this configuration, it becomes easier to reduce chromatic aberration of magnification and on-axis chromatic aberration.

The 1st lens unit B1 is constituted by, sequentially from the enlargement conjugate side to the reduction conjugate side, a negative lens L11, a negative lens L12, a negative lens L13 and a positive lens L14. With this configuration, an aberration fluctuation during focusing by the 1st lens unit B1 is reduced. The 2nd lens unit B2 is constituted by one positive lens L15. The 3rd lens unit B3 is constituted by one positive lens L16. The 4th lens unit B4 is constituted by, sequentially from the enlargement conjugate side to the reduction conjugate side, a negative lens L17, a positive lens L18, a negative lens L19 and a positive lens L20. The 5th lens unit B5 is constituted by a negative lens L21 and a positive lens L22.

With this configuration, an aberration fluctuation during zooming is reduced. The 6th lens unit B6 is constituted by one positive lens L23.

With the configuration described above, high optical performance is obtained in all the zooming range. The 5th lens unit B5 is moved from the reduction conjugate side to the enlargement conjugate side during zooming from the wide angle side to the telephoto side. With this configuration, a fluctuation in chromatic aberration during zooming is reduced.

An image projection apparatus illustrated in FIG. 13 will be described. In FIG. 13, the reference numeral 41 denotes a light source. The reference numeral 42 denotes an illumination optical system which provides even illumination to the image display elements and has a function to arrange a polarization direction of emitted light in an arbitrary direction of P polarized light or S polarized light. The reference numeral 43 denotes a color separation optical system which separates light from the illumination optical system 42 into arbitrary colors corresponding to the image display elements.

The reference numerals 47, 48 and 49 denote image display elements which form an image consisting of reflective liquid crystal that modulates incident polarized light in accordance with electrical signals. The reference numerals 44 and 45 denote polarized beam splitters that transmit or reflect light in accordance with the modulation at the image display elements 47, 48 and 49. The reference numeral 46 denotes a color synthesis optical system which synthesizes light from the image display elements 47, 48 and 49. The reference numeral 50 denotes a projection optical system which projects light synthesized by the color synthesis optical system 46 on a material on which the light is to be projected, such as the screen 51.

The zoom lens of the present invention is used as the projection optical system 50. With this configuration, the obtained image projection apparatus has the following characteristics: even if a change in the F-number during zooming in the total zooming area is small, the change in various aberrations during zooming is desirably corrected and optical performance in the entire screen is appropriately maintained.

Preferred embodiments of the present invention have been described above, but the present invention is not limited to the embodiments. Various modifications and changes may be made without departing from the scope of the present invention.

Next, numerical embodiments of the zoom lens of each example will be described. Surface numbers in the lens configuration of the numerical embodiment 1 (Table A) are numbers sequentially given to each lens surface from the enlargement conjugate side to the reduction conjugate side.

r represents a radius of curvature of each lens surface and d represents an interval (i.e., a physical interval) on the optical axis between a lens surface i and a lens surface (i+1).

The interval indicated as variable in Table changes during zooming. nd and vd each represent a refractive index and an Abbe number with respect to a d-line of a material which constitutes each lens. The focal length, the aperture ratio (the F-number), the half field angle, the total lens length, the air-equivalent back focus (BF), the zoom ratio, and the intervals between each lens unit during zooming of the zoom lens of the numerical embodiment are shown in (A). The aspheric surface coefficients A, B, C . . . to G for describing an aspheric surface shape are shown in (B).

The aspheric surface shape is expressed by the following equation when the optical axis direction corresponds to the x axis, a direction perpendicular to the optical axis corresponds to the y axis, the light traveling direction corresponds to the positive direction, R denotes a paraxial radius of curvature, K denotes the conic constant, A, B, C, . . . denote aspheric surface coefficients and E-X is set to $10^{-X}$.

$$x=(y^2/R)/[1+\{1-(1+K)(y^2/R^2)\}^{1/2}]+Ay^4+By^6+Cy^8+Dy^{10}+Ey^{12}+Fy^{14}+Gy^{16}$$

Relationships between above-described each example and the numerical values are shown in Table 1.

Numerical Embodiment 1

(A) Lens configuration

| | Wide angle | Middle | Telephoto |
|---|---|---|---|
| f (focal length) | 21.78 | 30.71 | 39.20 |
| F (aperture ratio) | 2.8 | 2.8 | 2.8 |
| Angle of view | 31.0 | 23.1 | 18.5 |

| Total lens length | 166.9 |
|---|---|
| BF | 59.2 |
| Zoom ratio | 1.80 |

| r1 = 35.62 | d1 = 2.50 | n1 = 1.805 | v1 = 25.4 |
|---|---|---|---|
| r2 = 25.53 | d2 = 7.59 | | |
| r3 = 75.80 | d3 = 3.00 | n2 = 1.531 | v2 = 55.9 |
| r4 = 31.32 | d4 = 16.30 | | |
| r5 = −30.46 | d5 = 2.00 | n3 = 1.487 | v3 = 70.2 |
| r6 = 67.66 | d6 = 5.01 | | |
| r7 = 264.92 | d7 = 4.55 | n4 = 1.806 | v4 = 33.3 |
| r8 = −56.77 | d8 = variable | | |
| r9 = ∞ | d9 = 5.03 (auxiliary diaphragm) (AP) | | |
| r10 = 47.30 | d10 = 2.35 | n5 = 1.487 | v5 = 70.2 |
| r11 = 55.12 | d11 = variable | | |
| r12 = 50.39 | d12 = 4.20 | n6 = 1.834 | v6 = 37.2 |
| r13 = −5389.26 | d13 = variable | | |
| r14 = ∞ | d14 = variable (aperture diaphragm) (ST) | | |
| r15 = −150.01 | d15 = 1.30 | n7 = 1.806 | v7 = 33.3 |
| r16 = 18.79 | d16 = 8.40 | n8 = 1.618 | v8 = 63.3 |
| r17 = −30.81 | d17 = 1.21 | | |
| r18 = −20.49 | d18 = 1.30 | n9 = 1.805 | v9 = 25.4 |
| r19 = −570.14 | d19 = 0.52 | | |
| r20 = 120.54 | d20 = 7.60 | n10 = 1.497 | v10 = 81.5 |
| r21 = −23.89 | d21 = variable | | |
| r22 = −95.95 | d22 = 1.85 | n11 = 1.800 | v11 = 29.8 |
| r23 = 30.03 | d23 = 9.25 | n12 = 1.805 | v12 = 25.4 |
| r24 = −67.24 | d24 = variable | | |
| r25 = 62.41 | d25 = 3.70 | n13 = 1.805 | v13 = 25.4 |
| r26 = 281.63 | d26 = 2.3 | | |
| r27 = ∞ | d27 = 30.0 | n14 = 1.516 | v14 = 64.1 |
| r28 = ∞ | d28 = 1.9 | | |
| r29 = ∞ | d29 = 17.7 | n15 = 1.805 | v15 = 25.4 |
| r30 = ∞ | d30 = 5.0 | | |
| r31 = ∞ | d31 = 2.3 | n16 = 1.516 | v16 = 64.1 |

| During zooming (2100 mm) | | | | During focusing (wide angle end) | | |
|---|---|---|---|---|---|---|
| Unit interval | Wide angle | Middle | Telephoto | Unit interval | 1200 mm | 9000 mm |
| d8 | 35.45 | 4.55 | 3.89 | d6 | 5.25 | 4.70 |
| d11 | 15.57 | 22.30 | 4.13 | d8 | 34.81 | 36.44 |
| d13 | 6.28 | 21.82 | 32.38 | | | |
| d14 | 19.39 | 9.65 | 1.50 | | | |
| d21 | 1.57 | 10.04 | 7.51 | | | |
| d24 | 1.00 | 10.89 | 29.85 | | | |

(B) Aspheric surface coefficient r3 K = 0 A = 1.73E−05 B = −3.17E−08 C = 2.98E−11 D = 1.09E−13
E = −1.13E−16 F = −3.59E−19 G = 6.86E−22 r4 K = 0 A = 1.22E−05 B = −3.39E−08 C = −1.53E−11 D = 1.03E−13
E = 1.31E−15 F = −5.79E−18 G = 7.26E−21

Numerical Embodiment 2

(A) Lens configuration

| | Wide angle | Middle | Telephoto |
|---|---|---|---|
| f (focal length) | 21.77 | 30.72 | 39.26 |
| F (aperture ratio) | 2.8 | 2.8 | 2.8 |
| Angle of view | 31.0 | 23.2 | 18.4 |

| Total lens length | 175.0 |
|---|---|
| BF | 59.4 |
| Zoom ratio | 1.80 |

| r1 = 47.15 | d1 = 2.30 | n1 = 1.805 | v1 = 25.4 |
|---|---|---|---|
| r2 = 25.59 | d2 = 11.59 | | |
| r3 = 80.00 | d3 = 3.16 | n2 = 1.531 | v2 = 55.9 |
| r4 = 33.74 | d4 = 12.10 | | |
| r5 = −30.75 | d5 = 3.29 | n3 = 1.487 | v3 = 70.2 |
| r6 = 123.04 | d6 = 1.14 | | |
| r7 = 268.36 | d7 = 5.97 | n4 = 1.806 | v4 = 33.3 |
| r8 = −49.48 | d8 = variable | | |
| r9 = ∞ | d9 = 5.00 (auxiliary diaphragm) (AP) | | |
| r10 = 53.35 | d10 = 3.12 | n5 = 1.487 | v5 = 70.2 |
| r11 = 102.43 | d11 = variable | | |
| r12 = 52.02 | d12 = 4.41 | n6 = 1.834 | v6 = 37.2 |
| r13 = 668.69 | d13 = variable | | |
| r14 = ∞ | d14 = variable (aperture diaphragm)(ST) | | |
| r15 = −57.99 | d15 = 1.30 | n7 = 1.755 | v7 = 27.6 |
| r16 = 20.96 | d16 = 8.34 | n8 = 1.529 | v8 = 66.4 |
| r17 = −26.77 | d17 = 1.26 | | |
| r18 = −19.01 | d18 = 1.30 | n9 = 1.805 | v9 = 25.4 |
| r19 = −106.79 | d19 = 0.50 | | |
| r20 = 253.48 | d20 = 8.04 | n10 = 1.497 | v10 = 81.5 |
| r21 = −24.99 | d21 = variable | | |
| r22 = −161.98 | d22 = 1.85 | n11 = 1.800 | v11 = 29.8 |
| r23 = 100.00 | d23 = 6.94 | n12 = 1.805 | v12 = 25.4 |
| r24 = −61.09 | d24 = variable | | |
| r25 = 70.40 | d25 = 4.23 | n13 = 1.805 | v13 = 25.4 |
| r26 = 2819.65 | d26 = 2.3 | | |
| r27 = ∞ | d27 = 30.0 | n14 = 1.516 | v14 = 64.1 |
| r28 = ∞ | d28 = 1.9 | | |
| r29 = ∞ | d29 = 17.7 | n15 = 1.805 | v15 = 25.4 |
| r30 = ∞ | d30 = 5.0 | | |
| r31 = ∞ | d31 = 2.3 | n16 = 1.516 | v16 = 64.1 |

-continued

| During zooming (2100 mm) | | | | During focusing (wide angle end) | | |
|---|---|---|---|---|---|---|
| Unit interval | Wide angle | Middle | Telephoto | Unit interval | 1200 mm | 9000 mm |
| d8 | 44.15 | 14.88 | 3.90 | d6 | 5.25 | 4.70 |
| d11 | 14.44 | 16.68 | 6.43 | d8 | 34.81 | 36.44 |
| d13 | 14.35 | 26.93 | 36.68 | | | |
| d14 | 14.72 | 7.44 | 1.19 | | | |
| d21 | 1.00 | 6.03 | 6.32 | | | |
| d24 | 0.50 | 17.20 | 34.65 | | | |

(B) Aspheric surface coefficient r3 K = 0 A = 1.79E−05 B = −4.31E−08 C = 1.90E−10 D = −7.30E−13
E = 2.32E−15 F = −4.20E−18 G = 3.21E−21
r4 K = 0 A = 1.14E−05 B = −3.66E−08 C = 9.65E−11 D = −4.64E−13
E = 2.58E−15 F = −6.98E−18 G = 7.18E−21

Numerical Embodiment 3

(A) Lens configuration

| | Wide angle | Middle | Telephoto |
|---|---|---|---|
| f (focal length) | 21.75 | 30.70 | 39.24 |
| F (aperture ratio) | 2.8 | 2.8 | 2.8 |
| Angle of view | 31.0 | 23.1 | 18.5 |
| Total lens length | | 181.0 | |
| BF | | 58.2 | |
| Zoom ratio | | 1.80 | |

| r1 = 56.19 | d1 = 4.00 | n1 = 1.805 | v1 = 25.4 |
|---|---|---|---|
| r2 = 25.59 | d2 = 8.20 | | |
| r3 = 80.00 | d3 = 3.03 | n2 = 1.531 | v2 = 55.9 |
| T4 = 32.22 | d4 = 12.23 | | |
| r5 = −31.78 | d5 = 3.00 | n3 = 1.487 | v3 = 70.2 |
| r6 = 180.84 | d6 = 2.13 | | |
| r7 = 226.61 | d7 = 6.91 | n4 = 1.806 | v4 = 33.3 |
| r8 = −50.67 | d8 = variable | | |
| r9 = ∞ | d9 = 5.00 (auxiliary diaphragm) (AP) | | |
| r10 = 59.63 | d10 = 3.46 | n5 = 1.487 | v5 = 70.2 |
| r11 = 185.24 | d11 = variable | | |
| r12 = 52.61 | d12 = 4.08 | n6 = 1.834 | v6 = 37.2 |
| r13 = 326.80 | d13 = variable | | |
| r14 = ∞ | d14 = variable (aperture diaphragm)(ST) | | |
| r15 = −266.18 | d15 = 1.30 | n7 = 1.751 | v7 = 31.7 |
| r16 = 18.63 | d16 = 8.76 | n8 = 1.487 | v8 = 70.4 |
| r17 = −28.72 | d17 = 1.33 | | |
| r18 = −19.55 | d18 = 1.30 | n9 = 1.805 | v9 = 25.4 |
| r19 = −573.79 | d19 = 0.50 | | |
| r20 = 130.84 | d20 = 8.59 | n10 = 1.497 | v10 = 81.5 |
| r21 = −23.31 | d21 = variable | | |
| r22 = −63.20 | d22 = 1.85 | n11 = 1.686 | v11 = 32.0 |
| r23 = 76.16 | d23 = 7.67 | n12 = 1.755 | v12 = 27.6 |
| r24 = −53.54 | d24 = variable | | |
| r25 = 75.14 | d25 = 4.45 | n13 = 1.805 | v13 = 25.4 |
| r26 = −488.19 | d26 = 2.3 | | |
| r27 = ∞ | d27 = 30.0 | n14 = 1.516 | v14 = 64.1 |
| r28 = ∞ | d28 = 1.9 | | |
| r29 = ∞ | d29 = 17.7 | n15 = 1.805 | v15 = 25.4 |
| r30 = ∞ | d30 = 5.0 | | |
| r31 = ∞ | d31 = 2.3 | n16 = 1.516 | v16 = 64.1 |

| During zooming (2100 mm) | | | | During focusing (wide angle end) | | |
|---|---|---|---|---|---|---|
| Unit interval | Wide angle | Middle | Telephoto | Unit interval | 1200 mm | 9000 mm |
| d8 | 45.94 | 15.16 | 0.50 | d6 | 5.25 | 4.70 |
| d11 | 19.20 | 23.78 | 16.67 | d8 | 34.81 | 36.44 |
| d13 | 10.48 | 24.00 | 33.80 | | | |
| d14 | 15.59 | 7.20 | 0.67 | | | |
| d21 | 0.50 | 5.84 | 4.24 | | | |
| d24 | 0.50 | 16.22 | 36.31 | | | |

(B) Aspheric surface coefficient r3 K = 0 A = 1.66E−05 B = −4.68E−08 C = 1.01E−10 D = −1.40E−13
E = 2.48E−16 F = −5.09E−19 G = 3.63E−22
r4 K = 0 A = 1.04E−05 B = −5.19E−08 C = 7.98E−11 D = −1.51E−13
E = 7.29E−16 F = −2.14E−18 G = 1.84E−21

TABLE 1

| | CONDITIONAL EXPRESSION | | | | |
|---|---|---|---|---|---|
| | (1) | (2) | (3) | (4) | (5) |
| EXAMPLE 1 | 10.22 | 0.005 | 4.4 | 27.6 | 0.000008 |
| EXAMPLE 2 | 5.28 | 0.005 | 4.4 | 27.6 | 0.000002 |
| EXAMPLE 3 | 9.18 | 0.069 | 4.4 | 29.8 | 0.000041 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-172022 filed Aug. 22, 2013, which is hereby incorporated by reference herein in its entirety.

What is claimed is:

1. A zoom lens comprising, sequentially from an enlargement conjugate side to a reduction conjugate side:
a first lens unit having negative refractive power that is not moved during zooming;
plural lens units that are moved during zooming; and
a final lens unit having positive refractive power that is not moved during zooming,
wherein
a final moving lens unit having positive refractive power and disposed nearest to the reduction conjugate side among the plural lens units that are moved during zooming is moved toward the enlargement conjugate side during zooming from a wide angle end to a telephoto end, and the final moving lens unit includes one or more negative lenses and one or more positive lenses, and one negative lens of the one or more negative lenses and one positive lens of the one or more positive lenses are cemented with each other; and
the following conditions are satisfied:

$$5.00 < f/fw$$

$$lnn - npl < 0.080$$

$$0.0 < vn - vp$$

where
f is a focal length of the final moving lens unit;
fw is a focal length of the zoom lens at a wide angle end;
nn and vn are respectively an average refractive index and an average Abbe number of a material of the one or more negative lenses included in the final moving lens unit; and np and vp are respectively an average refractive index and an average Abbe number of a material of the one or more positive lenses included in the final moving lens unit, provided that, when a refractive index for C-line is denoted by NC, a refractive index for d-line is denoted by Nd, and a refractive index for F-line is denoted by NF, the Abbe number $v=(Nd-1)/(NF-NC)$.

2. The zoom lens according to claim 1, wherein the first lens unit has a focusing function, the plural lens units that are moved during zooming are constituted by, from the enlargement conjugate side to the reduction conjugate side, a second lens unit having positive refractive power, a third lens unit having positive refractive power, a fourth lens unit having negative refractive power and a fifth lens unit having positive refractive power.

3. The zoom lens according to claim 1, wherein a cemented lens consisting of the one negative lens and the one positive lens has a surface on the enlargement conjugate side that is concave shaped and a cemented lens surface that is convex shaped toward the enlargement conjugate side and is convex shaped toward the reduction conjugate side.

4. The zoom lens according to claim 1, wherein when the average Abbe number of a material of all lenses included in the final moving lens unit is set to vav, the following conditional expression is satisfied:

$$vav<40.0.$$

5. The zoom lens according to claim 1, wherein the final moving lens unit does not include another lens other than a cemented lens consisting of the one negative lens and the one positive lens.

6. The zoom lens according to claim 2, further comprising an aperture diaphragm which moves on a track that is different from those of other lens units during zooming of the third lens unit toward the reduction conjugate side.

7. The zoom lens according to claim 5, wherein, when refractive power of the cemented lens surface of the cemented lens of the final moving lens unit is set to $\phi a$, the following conditional expression is satisfied:

$$0.000<\phi a/fw<0.001.$$

8. An image display device, comprising:
a zoom lens; and
an image display element configured to form an original image projected by the zoom lens
wherein the zoom lens comprising:
a first lens unit having negative refractive power that is not moved during zooming;
plural lens units that are moved during zooming;
a final lens unit having positive refractive power that is not moved during zooming;
wherein
a final moving lens unit having positive refractive power and disposed nearest to the reduction conjugate side among the plural lens units that are moved during zooming is moved toward the enlargement conjugate side during zooming from the wide angle end to the telephoto end, and
the final moving lens unit includes one or more negative lenses and one or more positive lenses and one negative lens of the one or more negative lenses and one positive lens of the one or more positive lenses are cemented with each other; and
the following conditions are satisfied:

$$5.00<f/fw$$

$$lnn-npl<0.080$$

$$0.0<vn-vp$$

where
f is a focal length of the final moving lens unit;
fw is a focal length of an entire system at a wide angle end;
nn and vn are respectively an average refractive index and an average Abbe number of a material of the one or more negative lenses at is included in the final movement lens unit;
np and vp are respectively an average refractive index and an average Abbe number of a material of the one or more positive lenses included in the final moving lens unit,
provided that, when a refractive index for C-line is denoted by NC, a refractive index for d-line is denoted by Nd, and a refractive index for F-line is denoted by NF, the Abbe number $v=(Nd-1)/(NF-NC)$.

* * * * *